United States Patent [19]

Thompson et al.

[11] 4,027,577

[45] June 7, 1977

[54] BAG-MAKING APPARATUS AND PROCESS FOR MAKING PORTED BAGS

[75] Inventors: John A. Thompson, Berkeley; Robert V. Torres, Pinole, both of Calif.

[73] Assignee: Cutter Laboratories, Inc., Berkeley, Calif.

[22] Filed: July 25, 1975

[21] Appl. No.: 599,303

[52] U.S. Cl. .................. 93/35 PC; 93/8 VB; 198/692

[51] Int. Cl.² ............ B31B 1/84; B31B 23/74

[58] Field of Search ............ 93/8 VB, 8 WA, 8 R, 93/35 R, 14–20, 35 PC; 53/14, 128, 167, 180 R, 182 R, 183; 198/692, 178

[56] References Cited

UNITED STATES PATENTS

| | | | |
|---|---|---|---|
| 3,192,096 | 6/1965 | Rhine | 198/178 X |
| 3,200,936 | 8/1965 | Briggs | 198/178 |
| 3,228,357 | 1/1966 | Bruschke et al. | 198/178 X |
| 3,244,576 | 4/1966 | Swartz | 93/8 VB X |
| 3,283,671 | 11/1966 | Campbell, Jr. | 93/8 WA |
| 3,352,737 | 11/1967 | Jordan | 93/8 VB X |
| 3,599,388 | 8/1971 | Feingold | 53/183 X |
| 3,791,267 | 2/1974 | Brooks | 93/8 R X |
| 3,922,835 | 12/1975 | Reil | 53/167 |

*Primary Examiner*—James F. Coan
*Attorney, Agent, or Firm*—Robert E. Allen; Bertram Bradley

[57] ABSTRACT

A process and apparatus adapted to automate the conversion of a continuous sheet of flexible plastic film into ported bags. The apparatus includes means for maintaining the film sheet in proper alignment during the various processing steps and functions in a manner which reduces environmental particulate contamination of the bags to a minimum.

13 Claims, 23 Drawing Figures

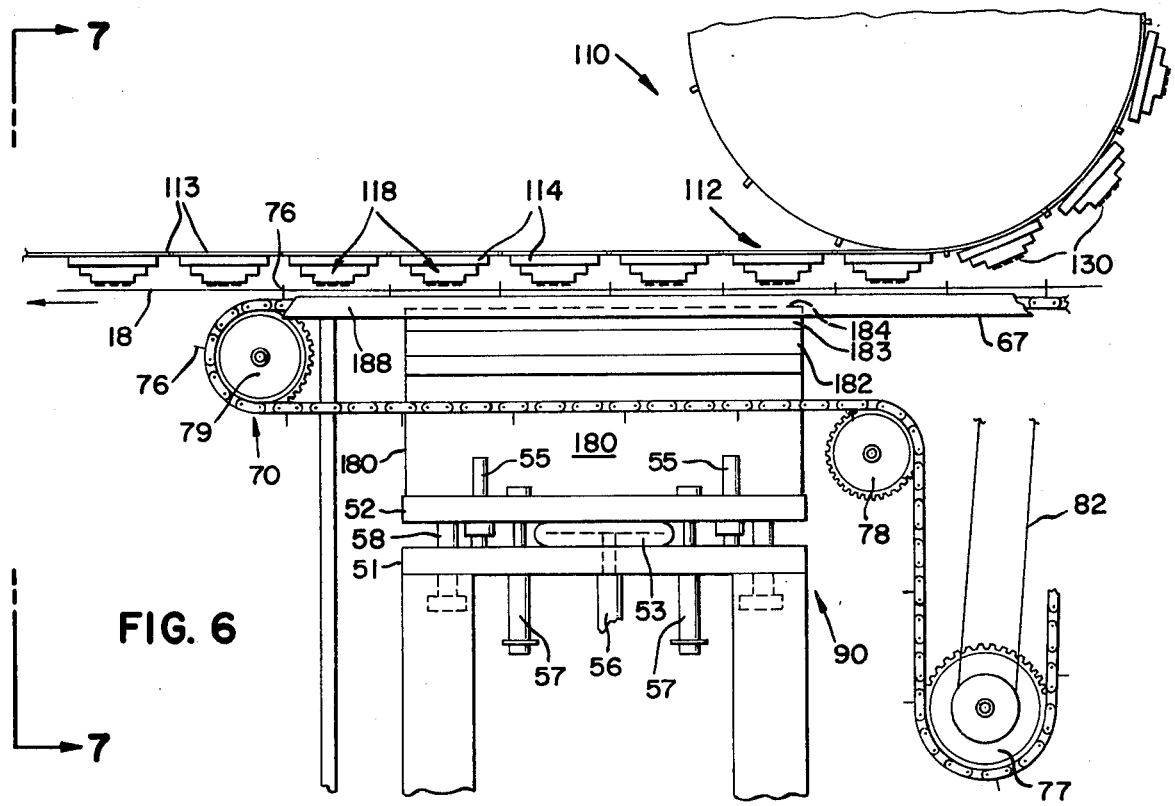
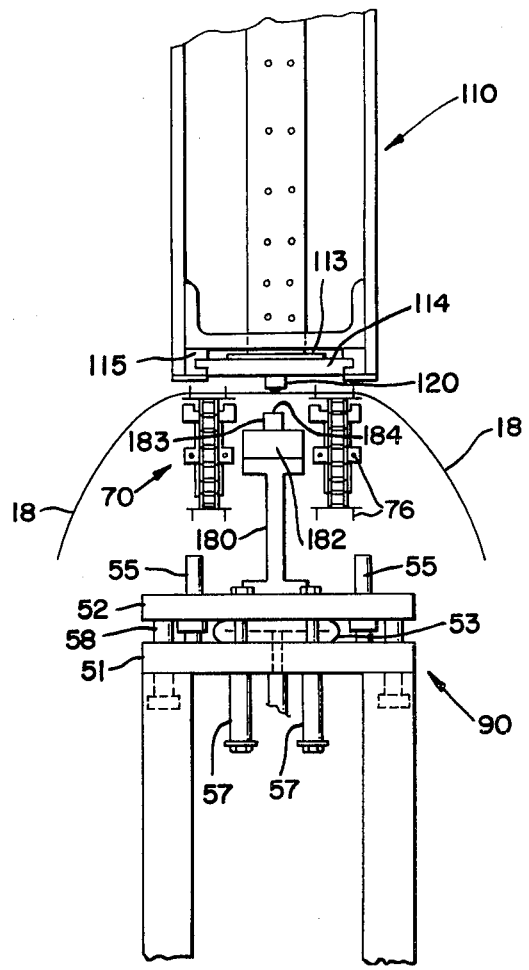

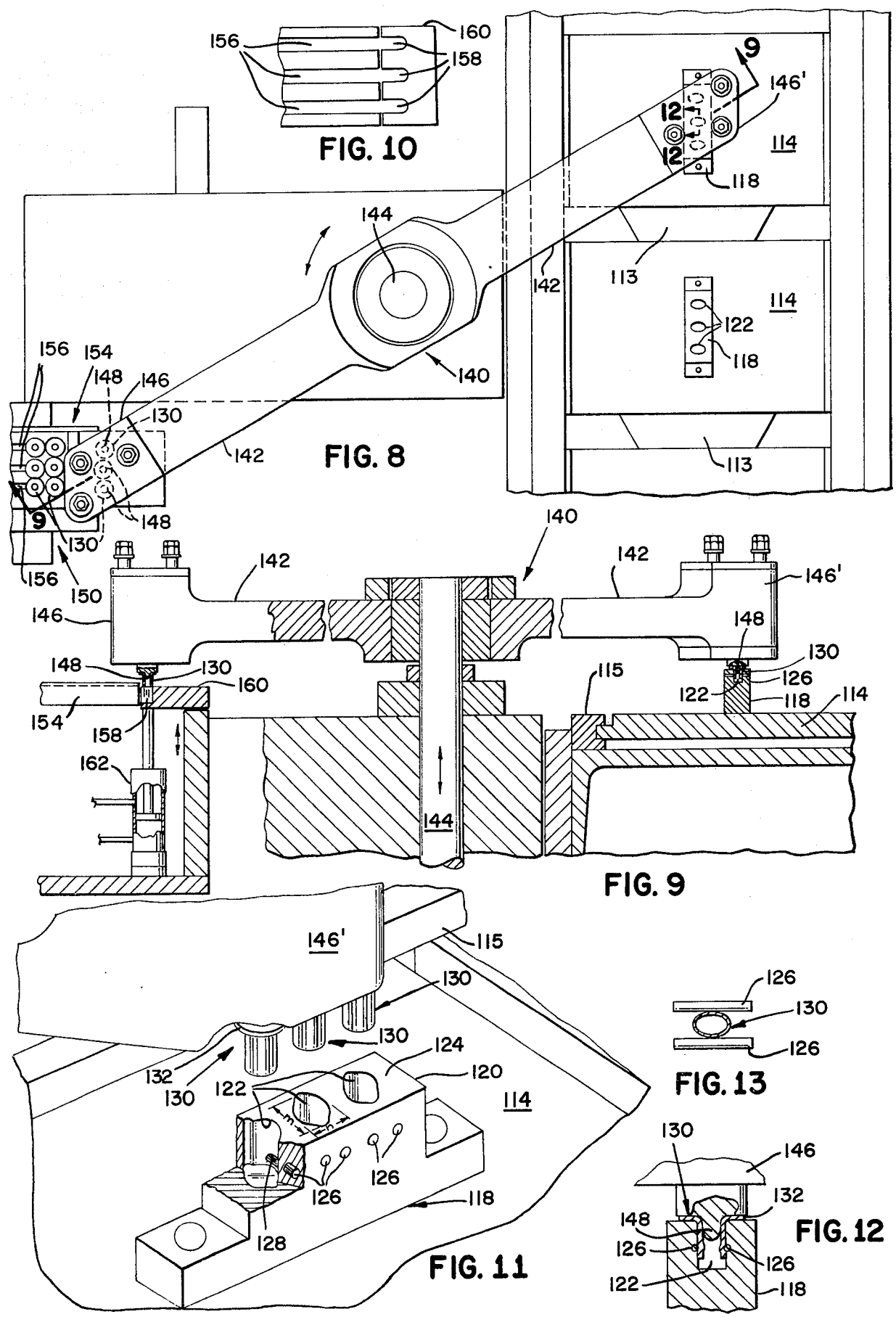

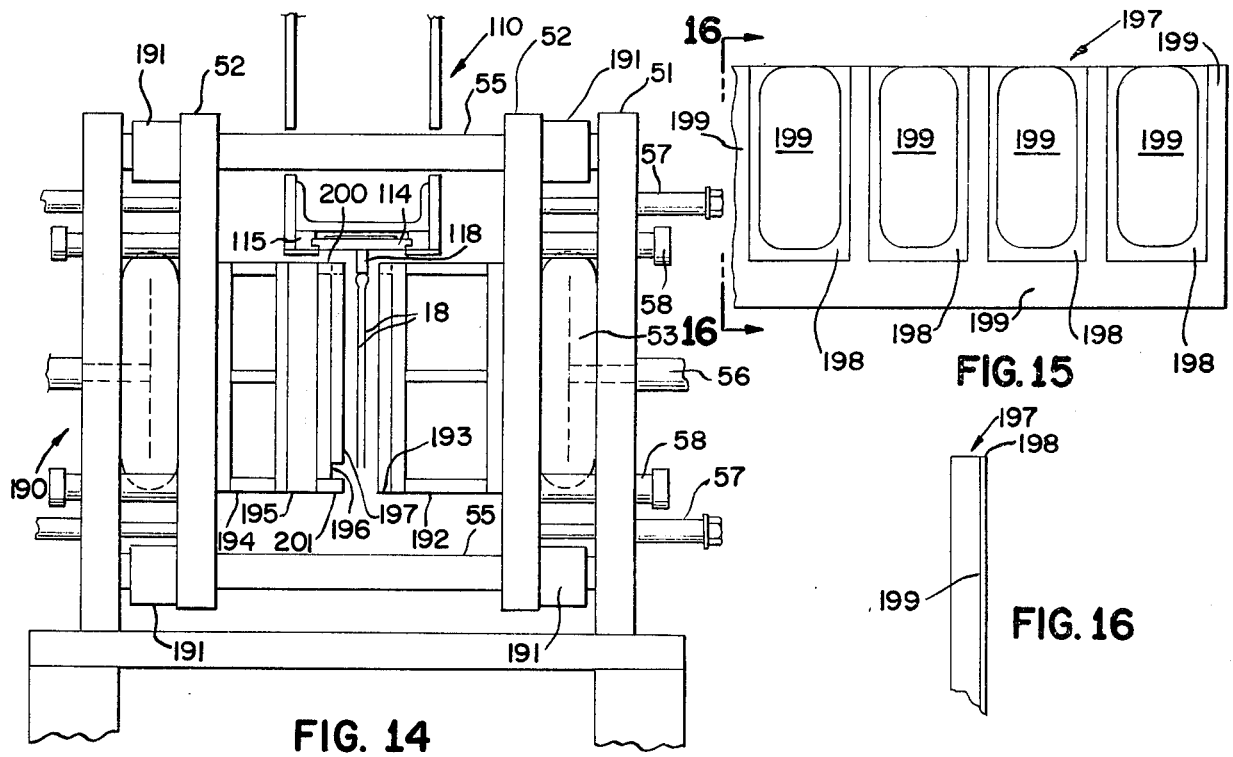
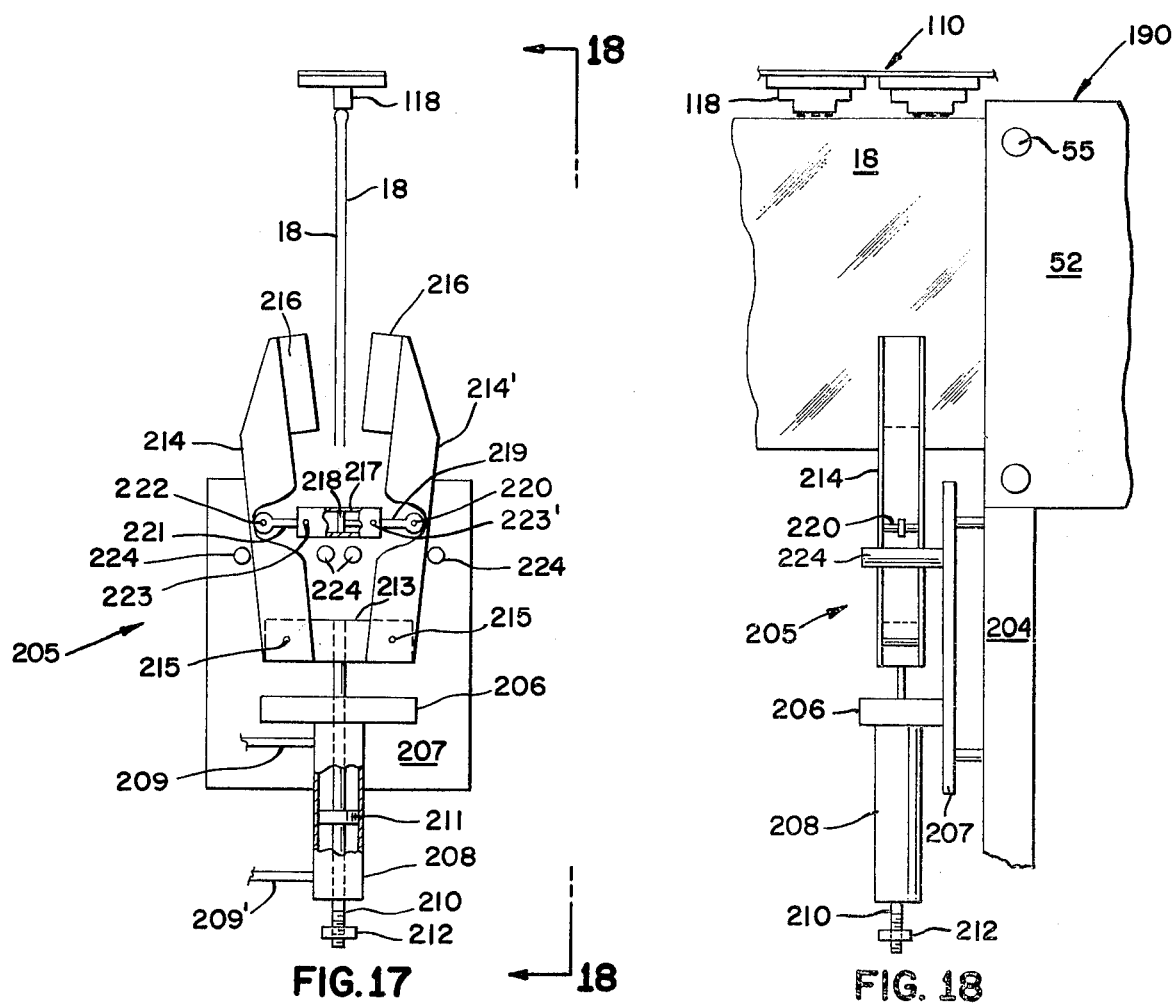

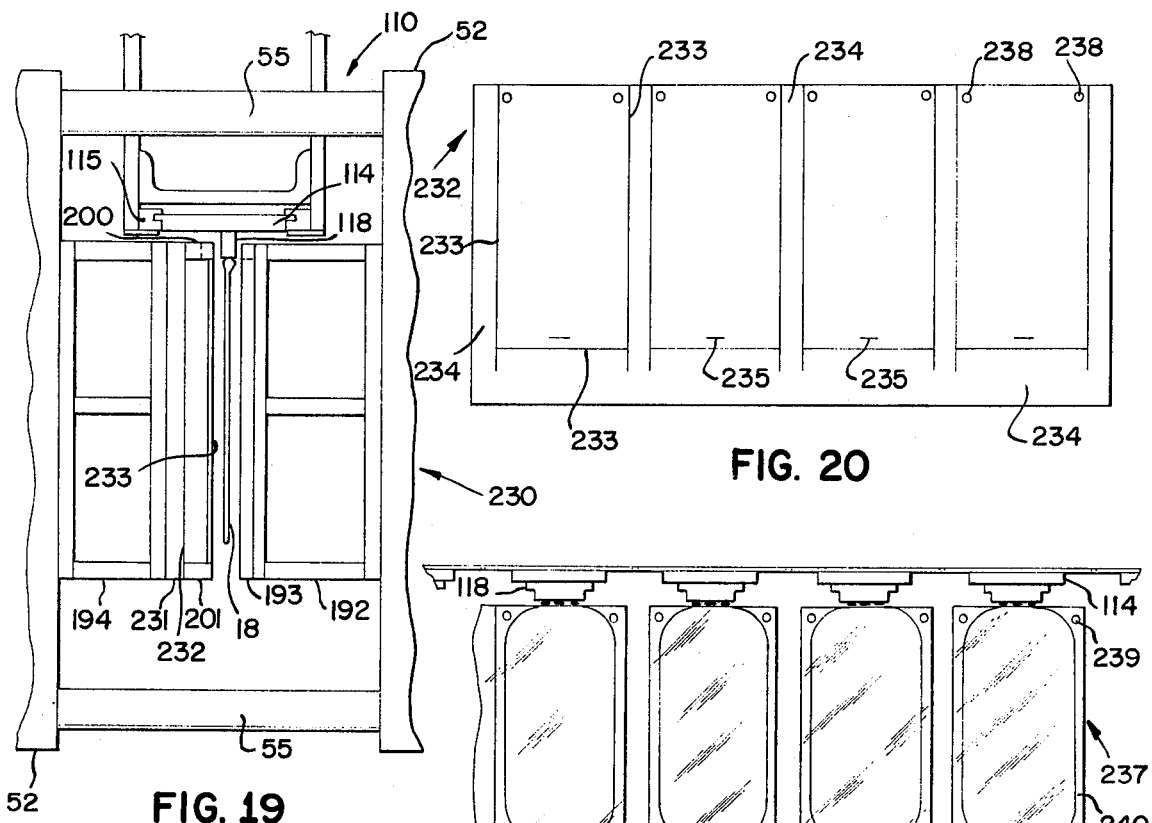
FIG. 19
FIG. 20
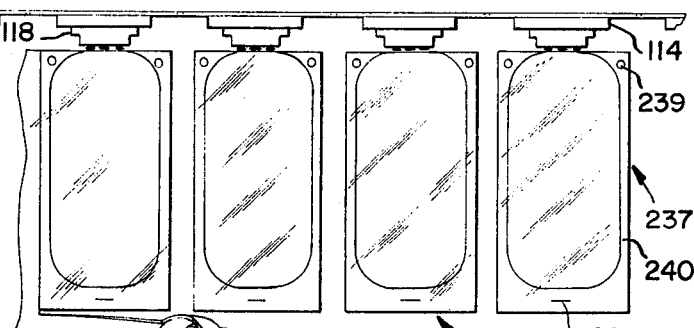
FIG. 21
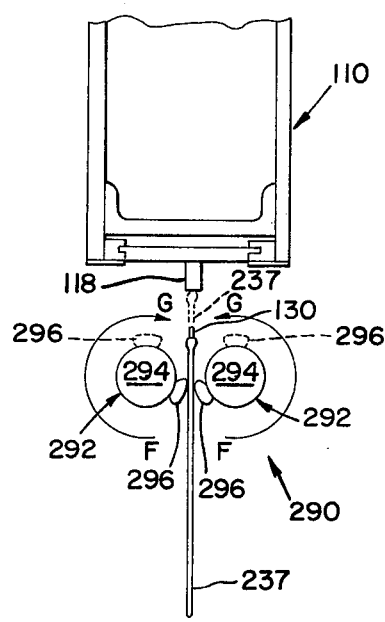
FIG. 22
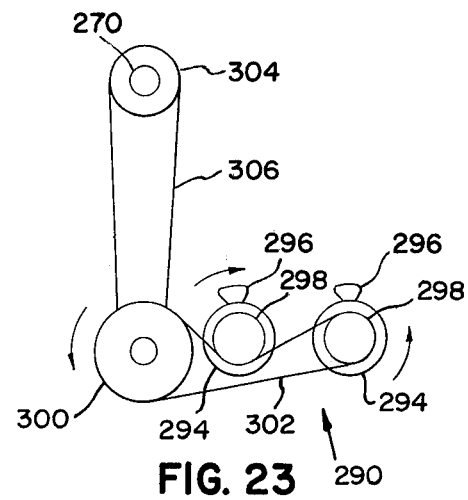
FIG. 23

BAG-MAKING APPARATUS AND PROCESS FOR MAKING PORTED BAGS

This invention relates to a method and apparatus for making flexible bags with one or more ports sealed thereto.

BACKGROUND OF THE INVENTION

Flexible bags when made by automated equipment are generally formed either by transverse seals on tubular plastic film, by marginally sealing two separate layers of film, or by folding a single ply and sealing the two plies thus formed at margins to generate a closed bag.

In the manufacture of some plastic bags, for example those for containing parenteral solutions, blood or blood plasma, access ports are provided. Furthermore, with bags used for collecting and storing such products, the interior surfaces should be clean and free of particulate matter so as to avoid clogging of needles or avoid the infusion of particulates into patients receiving these products. To provide ports and to assure freedom of particulates, such requirements have imposed problems in attempts to automate manufacturing processes. In current practice, some of the steps in a process are automated and some are performed by assembly line personnel. For example, sheets of plastic film, to which ports have been sealed along a center line of the sheet, are manually folded at the center line, the two plies then positioned on a sealing die, and any wrinkles smoothed out by hand before edge seals are effected by the sealing die. Regardless of how much care is taken, the fact remains that manual operations by line personnel contribute significantly to the generation of particulate matter and make it extremely difficult if not impossible to manufacture bags free of particulates.

Automation in the manufacture of ported bags, although most desirable from the standpoint of helping to eliminate many of the contamination problems associated with manual operations, as well as to increase the speed and efficiency in the fabrication of bags, nevertheless poses a number of technical problems, particularly when dealing with flexible plastic film. A continuous sheet of such film is difficult to maintain in a straight line and in uniform longitudinal dimensions as it is made to progress through various processing stages in the fabrication of bags. In folding plastic sheet over to form two plies to be sealed at fixed areas to form bags, the nature of the plastic generally causes wrinkles to be formed which must be removed prior to sealing. These and other characteristics inherent in flexible plastic film add to the difficulties in trying to completely automate the fabrication of ported plastic bags.

SUMMARY OF THE INVENTION

It is an object of the present invention to provide an apparatus which automates the fabrication of ported flexible bags and thereby eliminates particulate contamination of the bags.

Another object of this invention is to provide an apparatus which allows a continuous sheet of flexible film to be converted into particulate-free ported bags wherein the surface of the film which becomes the interior of the bags is minimally exposed to the environment.

A further object of the invention is to provide an apparatus for the fabrication of plastic bags wherein the apparatus includes film retaining means for maintaining a continuous film sheet in a straight path and with constant longitudinal dimensions as it progresses through certain critical processing steps.

It is still a further object of the invention to provide an apparatus for making plastic bags from a continuous sheet of film wherein the apparatus includes means for removing wrinkles in the film prior to the sealing of the film to generate bags.

The apparatus of the present invention which accomplishes these objectives comprises a longitudinally arranged series of units wherein a continuous sheet of heat-sealable plastic film is passed through a brush vacuum cleaner then floated over air rolls in a tensioning system to a first press unit. The film is pressed onto two parallel conveyors spaced a short distance apart wherein these conveyors have film retaining means which hold the film to the twin conveyors to prevent the film from drifting, sagging or stretching. Since tubular ports with sealing flanges are to be sealed on a fold line of the film at a later step, the film retaining conveyor maintains the film in the proper position to assure that the ports are sealed at the desired fold line. Ports thus sealed will result in bags in which there are penetrable diaphragms at the inner end of the ports. Alternatively, in some situations bags may be desired in which there are no diaphragms sealing the access in the ports. In this case the first press unit may also include film punching means for making spaced apertures along the fold line of the film over which ports will be sealed in a subsequent step. The film retaining means on the twin conveyor assure that the apertures coincide with the tubular passages of the ports at the time of sealing of the ports to the film.

The film retaining conveyor next transports the film to a port sealing unit where a multiplicity of spaced flanged ports are positioned over the fold line of the film or to coincide with the apertures in the film as the case may be. The ports are positioned by an overhead port conveyor having means for retaining the tubular portion of the ports. Port loading means are associated with the port conveyor which place flanged ports into spaced slots on the port conveyor where they are held by the port retaining means. The port sealing unit then is actuated to seal the flanges of a series of ports to the fold line or to the portions of film surrounding the spaced apertures in the film.

As the film leaves the port sealing unit, the film is removed from the film retaining means on the conveyor. The film is retained by the sealed ports which are retained by the overhead port conveyor so that the two sides of the film drape together to form two plies of film, thus preventing interior surfaces from coming into contact with any particulate matter. The time lapse between the period when the film was vacuumed and the period when it assumes the completely draped position is a very few seconds so that the opportunity for interior surfaces to pick up particulates is minimal.

The draped film next enters a bag sealing unit. Draped film has a tendency to wrinkle which would result in the formation of creases in the walls of a bag after the sides were sealed. To overcome this problem, a film gripping means for removing wrinkles is located proximal to the bag sealing unit. Immediately following its actuation to smooth the two plies, the bag sealing unit, which comprises two vertically aligned sealing plates one of which has spaced projections, is actuated horizontally to seal the two plies of film to form a series of closed bags having marginal zones between each bag. When the plates move apart, the port conveyor moves the attached series of bags into a bag severing unit where inwardly moving cutting plates cause at lest a portion of the film between any two bags to be cut. After the cutting plates move outwardly, the conveyor carries the individual bags to a station where they are removed from the conveyor.

BRIEF DESCRIPTION OF THE DRAWINGS

Other objects and advantageous features of the invention will be apparent in a description of a specific embodiment thereof and described hereinafter with reference to the accompanying drawings, in which:

FIG. 6 is a side view of a port sealing unit in conjunction with a portion of a port conveyor and with a portion of the film retaining conveyor for the apparatus of FIG. 1;

FIG. 7 is a front view of the port sealing unit and port and film conveyors of FIG. 6 as seen along 7—7;

FIG. 8 is a plan view of a pick and place unit for inserting ports onto the port conveyor for the apparatus of FIG. 1 showing portions of a port feeder and port conveyor in relationship;

FIG. 9 is a view partially in cross-section and partially broken away of the pick and place unit, feeder and conveyor of FIG. 8 as seen generally along 9—9;

FIG. 10 is a plan view of the end portion of the port feeder and port stop as shown in FIG. 9;

FIG. 11 is a view in perspective of the details of a port retainer on the port conveyor and in relationship to a portion of the head of the pick and place unit with portions broken away on the head and port retainer;

FIG. 12 is a cross-sectional view showing a flanged port fitted on a portion of the head of a pick and place unit and with the tubular portion of the port held by a portion of the port retainer of FIG. 8 as seen along 12—12;

FIG. 13 is a simplified plan view illustrating the clamping effect of pins in the port retainer of FIG. 11 on the tubular portion of a port;

FIG. 14 is a side view with repetitive portions broken away of a bag sealing unit of the apparatus of FIG. 1;

FIG. 15 is a front view of the sealing plate portion of the bag sealing unit of FIG. 14;

FIG. 16 is a side view of a portion of the sealing plate of FIG. 15 as seen along 16—16;

FIG. 17 is a side view of a film gripping means for removing wrinkles as used in the apparatus of FIG. 1 with portions broken away for greater clarity;

FIG. 18 is a side view of the film gripping means of FIG. 17 as seen along 18—18 and in relationship to the bag sealing unit of FIG. 14;

FIG. 19 is a side view of the central portion only of a bag severing unit for the apparatus of FIG. 1;

FIG. 20 is a front view of the cutting plate portion of the bag severing unit of FIG. 19;

FIg. 21 is a side view showing a series of separate ported bags carried by a portion of the port conveyor after leaving the bag severing unit;

FIG. 22 is a front view schematically representing bag removing means in relationship to the port conveyor of the apparatus of FIG. 1; and FIG. 23 is a schematic view of a pulley arrangement for driving the bag removing unit of FIG. 22.

With reference to FIGS. 1 and 2, the apparatus of the invention is schematically represented as 10 and comprises a roller 12 for supporting a roll of plastic film 14. To make ported flexible bags, for example bags for the collection of blood, the film may be polyvinyl chloride (PVC) or any heat-sealable plastic compatible with blood. Preferably, in this example the film is PVC sheeting 24 inches wide.

Figure 2:
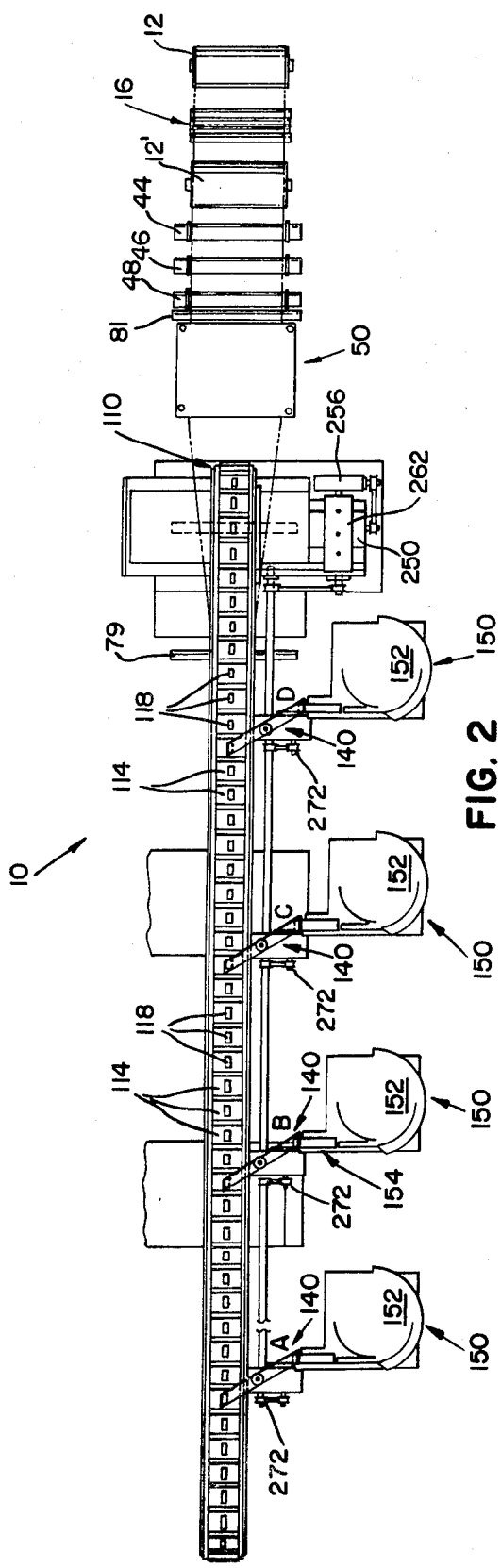
FIG. 2 is a plan view of the apparatus of FIG. 1 showing more clearly the relationship of port loading units to a port conveyor.

Optionally, if one desires not to have to interrupt the process of manufacturing bags when the end of the roll of sheeting is reached, a second roll of film 14' on roller 12' may be held in readiness and at the proper time may be spliced to the end of the first roll of film. Splicer 16 is a standard item such as an automatic lap splicer available from Compensating Tension Controls, Inc. (C.T.C.).

Film sheet 18 is first fed over rollers 20 and 22 and contacted with rotary vacuum brushes 24 and 26. Contact with these brushes is provided by rollers 28 and 30. Brushes 24 and 26 remove any particulate matter from both sides of film sheet 18 and these brushes are enclosed in housings 32 and 34 which are connected to a source of vacuum (not shown). The static electrical charge is removed from the film just upstream from brush 24 and this makes it easier for the brushes to remove particulates from the film. The vacuum brushes and static charge eliminating assembly is a standard item, a typical unit being that manufactured by Herbert Products, Inc.

The cleaned film sheet 18 is next carried over a drive roller 36 and subsequently through a film tensioning unit 38 comprised of tensioning rollers 40 and 42 and stationary air rolls 44, 46 and 48. Tensioning rollers 40 and 42 are capable of upward and downward movement, which movement is controlled by an attached air cylinder (not shown) which is responsive to changes in film tension. The air rolls 44, 46 and 48 provide cushions of filtered air over which film sheet 18 floats so as not to come in contact with these stationary rolls and thereby remains clean. Typical of the tensioning rollers and their controls are those manufactured by C.T.C. and the air rolls are a standard product of Mega System Design, Ltd. of Scarborough, Ontario, Canada.

Figure 4:
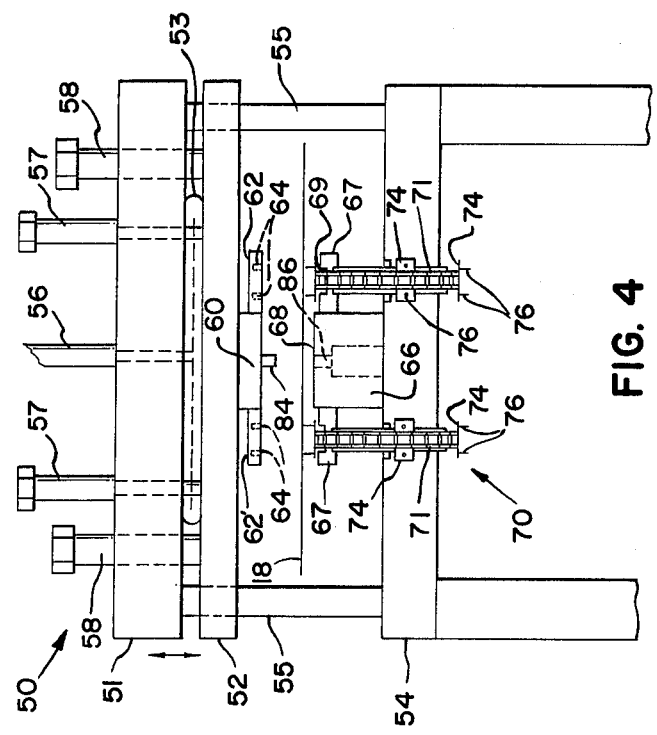
FIG. 4 is a front view of the press unit and twin conveyor of FIG. 3 as seen along 4—4.

The film 18 proceeds to a film pressing unit 50 (FIGS. 3 and 4) which in combination with a first conveyor or film retaining device 70 provide an important function in the process of making the bags. Since one of the objects of the process is to secure ports to a fold line of the film sheet 18, film retaining means must be provided in order to assure this requirement is met. Otherwise, without such retaining means, moving plastic film has a tendency to move to one side or the other from the fold line as it progresses through or over various processing units. Film retaining means also is essential for maintaining longitudinal dimension so as to avoid either sagging or stretching of the film and thus assure the ports are uniformly spaced as they are secured to the film.

Film pressing unit 50 includes a conventional air bladder operated press, typical of which is that supplied by the Airam Company. This unit 50 has a stationary plate 51 supported on posts 55, a movable plate 52 and a resilient bladder 53 between plates 51 and 52 capable of expansion and contraction as fluid, such as air, is introduced or removed via connection 56. A base plate 54 situated below plate 52 supports posts 55. Running through plate 51 and joined to plate 52 are returned rods 57 containing springs (not shown) which cause plate 52 to be returned to the position shown when air is exhausted from bladder 53. Also extending through plate 51 and connected to plate 52 are stop posts 58 which prevent plate 52 from descending more than a prescribed distance. This much of the pressing unit 50 is conventional.

Located centrally on plate 52 is a downwardly extending block 60 having horizontal extension plates 62, 62' secured thereto. The bottom side of plates 62, 62' may have a layer of penetrable material, for example sponge rubber, or they may have recessed slots 64 or other pin-receiving means. The purpose of plates 62, 62' will be understood with a subsequent description of the film retaining device 70. A block 66 is located centrally and extends upwardly from plate 54 so that block 60 on plate 52 is directly above block 66 on plate 54. Tracks 67 are located on each side of block 66 and extend outwardly therefrom slightly below the top 68 of block 66. Tracks 67 have a recess or slot 69 for retaining and supporting portions of the film retaining device 70 as will be explained below.

Figure 5:
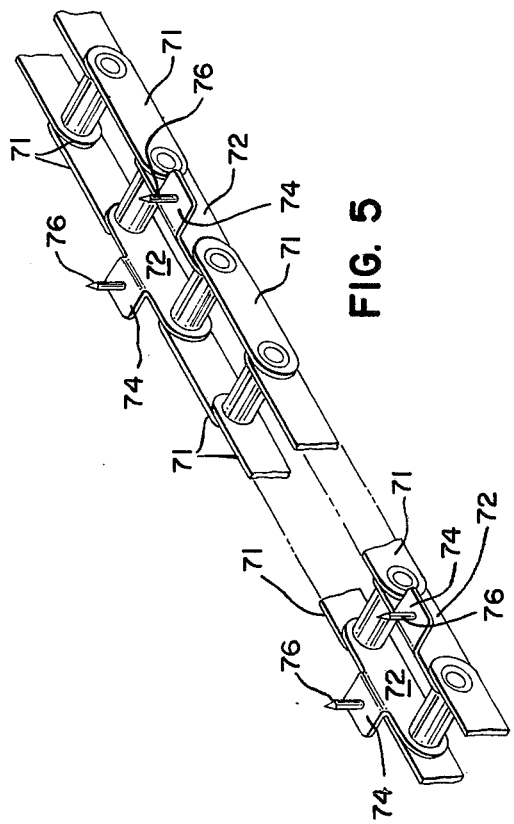
FIG. 5 is a perspective view of a portion of film retaining means of the twin conveyor of FIGS. 3 and 4 in greater detail.

Film retaining device or film conveyor 70 comprises two movable and continuous belt-like conveyances, each one arranged to run parallel to and on either side of block 66. In the example illustrated in FIGS. 3-5, conveyor 70 comprises two series of connected links 71 much like bicycle chains. At spaced intervals, specific links 72 have a bracket 74 extending outwardly on each side of link 72. Each bracket 74 provides support for pins 76 which are generally about ¼ inch long and extend vertically from bracket 74. In the present example the distance between the pins 76 on any two adjacent links 72 is 6 inches although this distance can vary depending on the size of the bag to be made.

The two series of links are driven by a multiplicity of cogged wheels 77, 78, 79, 80, 81 which in turn are powered by belts 82 connected to drive wheels 77 and to a central drive unit whose function will be described later. As each chain moves between plates 52 and 54 it is supported by tracks 67, i.e., the links ride within recess 69 so that brackets 74 are even with top 68 of block 66.

As film sheet 18 moves between plates 52 and 54, its central portion, i.e. about the middle 6 inches, is supported by blocks 66 and the tops of a number of pins 76. When the area between plates 52 and 54 is occupied by film 18, conveyor 70 is programmed to stop momentarily at which time pressured air supplied to bladder 53 via air hose 62 causes plate 52 to descend to a point whereby extension plates 62, 62' press film sheet 18 into pins 76 causing pins 76 to penetrate at points transversely across the film and retain the film to conveyor 70. The pins 76 extend into the spongy surface layer or into the slots 64 of plates 62, 62'. Air is released from the bladder 53 and the coil springs around rods 57 cause plate 52 to return to its original position, thus moving plates 62, 62' free from the pins 76.

Film pressing unit 50 can of course be of such dimensions as to fix the film onto the pins of one pair of links 72, i.e. one link 72 opposite a link 72 on each of the two chains 71. However, the length of extension plates 62, 62' and blocks 60, 66 can be quite long or of any reasonable length so as to secure a comparable length of film onto a corresponding length of conveyor 70. For example, in the present instance four pairs of opposite links 72 are utilized during one pressing operation to secure a length of about 24 inches of film onto conveyor 70. The film thus removably secured to conveyor 70, is retained in a manner whereby the film cannot slip to one side or the other nor can it become slack or stretched while it is retained by the full length of conveyor 70.

Figure 3:
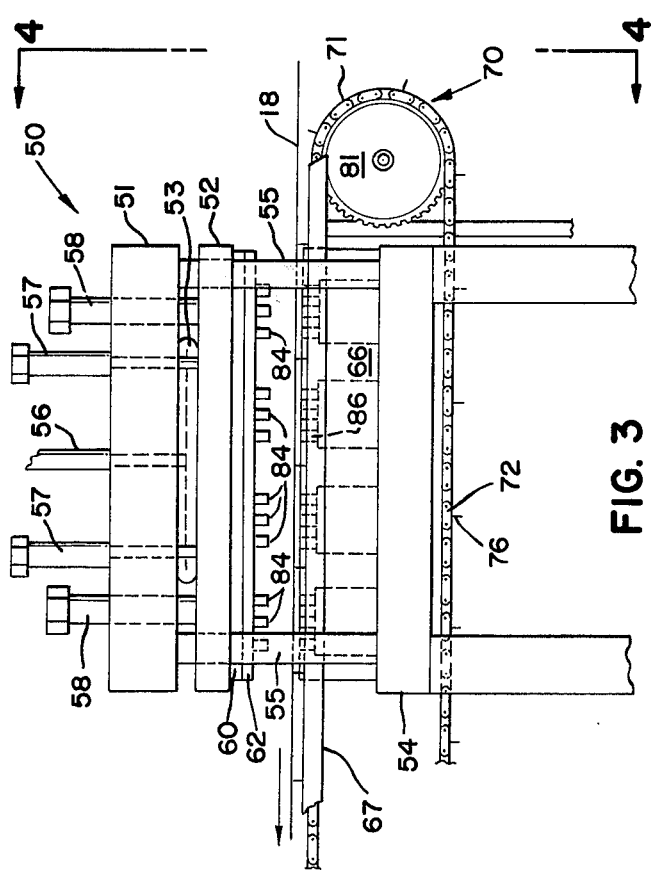
FIG. 3 is a side view of a film press unit including a die punch and a portion of a twin film retaining conveyor for the apparatus of FIG. 1.

Whereas some bags have ports sealed directly over the film so as to provide a thin diaphragm between the interior of the bag and the conduit of the port, in some instances it is desired to have one or more apertures in the film over which one or more ports is sealed so as to have direct communication between the conduit of a port and the interior of the bag. Film pressing unit 50 may optionally provide the additional function of creating such apertures simultaneously with the function of pressing the film onto pins 76. In such an operation, block 60 has one or more die punches 84 located on the center line in the longitudinal direction of block 60 and block 66 has a recess or recesses 86 to coincide with die punch or punches 84. As illustrated in FIG. 3, there are four groups of three punches 84, each group of three being spaced at uniform intervals. When pressing unit 50 is activated, four groups of three holes are formed longitudinally in the fold line of the film. It should be noted the punches 84 are so positioned that any one group of three holes thus formed will be located symmetrically between two imaginary transverse lines drawn between the pins on two adjacent pairs of links 72. The reason for this will become apparent subsequently. Fewer or more punches 84 may be used depending on what number of apertured ports are desired for a particular bag. The punches are removable so as to accommodate to the number desired. Combinations of apertured and non-apertured ports are possible as well. The arrangement as illustrated in FIG 3 provides for the formation of groups of four bags each having three apertured ports. Pressing 24 inch lengths of film onto pins on conveyor 70 and punching apertures into that length of film requires only a second or so although somewhat faster or slower times are possible.

The film sheet 18 is next transported by conveyor 70 to a port sealing unit 90. This unit 90 in cooperation with a second conveyor or port retaining conveyor 110 accomplish the sealing of ports to the top side of film sheet 18. Before this function is described, it will be necessary to described conveyor 110 in some detail (see FIGS. 1, 2 and 11).

Conveyor 110 insofar as its basic components are concerned is a conventional piece of equipment such as the device called a Trans-o-mater, TYPE BW, available from the Ferguson Machine Co. The Trans-o-mator 112 is basically a series of linked plates 113 to form the belt-like conveyor with a series of closely arranged pallets 114 attached to the plates, the plates moving in track 115. Each pallet 114 is approximately 6 inches long. The conveyor is indexed to move a distance of 24 inches or the length of four pallets 114, stop for a predetermined period, then move another 24 inches, etc.

Centrally located on each pallet 114 is a port retainer 118 which serves to transport and retain the multiplicity of ports to and from the remaining bag processing units. As best seen in FIG. 11, the port retainer 118 comprises a metallic block 120 with one or more recesses 122 in the top surface 124, the number of recesses depending on the number of ports one wishes to secure to a particular bag. Recess 122 has a slight inward taper. Somewhat below the top surface 124 are located two port retaining pegs 126 which extend transversely through block 120 at positions which allow an internal portion 128 to extend within recess 122. Ports 130 which are to be secured to the bags preferably are of the same plastic as that of the film used to make the bags and are short tubular members one end of which is surrounded by a flange 132, the portion which is sealed to the film of the bag. Two or more spaced ports all sharing a common flange could also be used in the apparatus of this invention.

When a port 130 is placed (flange side up) into a recess 122, the bottom side of the flange rests on surface 124 and the tubular portion engages the wall of the recess 122. Parts of two opposite sides of the tubular portion are also compressed inwardly (FIGS. 12 and 13) by the portions 128 of pegs 126 which, because of the resiliency of the plastic tubing, causes the tubular portion to be snugly retained. The tubular portion is distorted so that it assumes a kind of oval configuration in the vicinity of the pegs 126. To accommodate to this distortion, the recess 122 may be shaped accordingly, i.e., the axis $m$ being slightly greater than axis $n$.

The ports 130 are positioned into recesses 122 by a pick and place unit 140 (see FIGS. 8 and 9). The actuating means for unit 140 are supplied in a device manufactured by Ferguson Machine Co. Unit 140 consists of an arm 142 mounted on a shaft 144 which is actuated to move up and down as well as oscillate back and forth 180° at timed intervals. Each end 146, 146' of arm 142 has one or more downwardly directed pins 148 (depending on the number of ports to be sealed to a bag); in the illustrated example there are three equally spaced pins 148 in each end 146, 146'. Pins 148 are sized to fit a short distance into the tubular portion of ports 130 with sufficient frictional engagement that they will not fall off the pins 148.

To place one or more ports into the proper position, with the flange of the port on the top so that one end 146 (or 146') of arm 142 can pick up the ports by pins 148, a port feeding assembly 150 is positioned in the vicinity of the end 146 (or 146'). A unit such as that manufactured by Swanson Assembly Systems may be used. It consists of a vibrating bowl 152 which holds a supply of ports 130 and by vibrational motion directs the ports into a horizontal feeder track 154 having one or more (in the present example, three) longitudinal slots 156 into which the tubular portion of the ports nest. The forward most ports are pushed into resting slots 158 (FIG. 10) of a closely adjacent but separate platform 160 which is actuated by air cylinder 162 to move up and down a short distance at prescribed intervals.

When the end 146 of arm 142 is in a position directly over platform 160, actuation of shaft 144 causes arm 142 to descend. Simultaneously air pressure in the conventional two-way air cylinder 162 forces platform 160 to move upwardly to meet end 146 whereupon pins 148 engage ports 130. Air cylinder 162 is then actuated to bring platform 160 down in line with feeder track 154 for the ports next in line to be nested in slots 158. Simultaneously arm 142 is actuated by shaft 144 to move upwardly and pivot horizontally in an arc of 180°. At this point conveyor 110 stops with a pallet 114 holding a port retainer 118 directly below end 146 of arm 142. End 146' is also now directly above platform 160. Actuated shaft 144 causes arm 142 to descend whereupon the engaged ports on pins 146 are deposited into recesses 122 and retained by pegs 126 in port retainer 118. At the same time, end 146' has descended to meet ascending platform 160 to pick up the next set of ports 130. When shaft 144 is actuated to move upwardly again, the ports in the port retainer 118 being more firmly held by pegs 126 than by pins 146, remain seated in port retainer 118. Conveyor 110 carrying this particular port retainer 118 filled with ports then moves forward 24 inches. One complete single cycle of stop and go movement takes but a few seconds.

In the present example of the apparatus of this invention, each fabrication step is arranged so as to make a series of four bags at a time. With the width of each bag including salvage averaging 6 inches, the conveyors 70 and 110 thus must transport 24 inch portions of film 18 before the prescribed stops are made. This results in placing ports 130 in the recesses 122 of a port retainer 118 on every fourth pallet 114 (which are spaced every 6 inches). In order to have all recesses of every adjacent port retainer 118 in conveyor 110 filled with ports by the time conveyor 110 reaches port sealing unit 90, four pick and place units 140 and their respective port feeders 150 are required. Each unit 140 is spaced 52 inches from each other (positions A, B, C and D of FIG. 2) or one pallet 114 length greater than two 24-inch travel spans. This offset of one pallet length is necessary in order to present an unfilled port retainer 118 to each of the four pick and place units 140 after every travel span of 24 inches. All port retainers 118 will be filled with ports subsequent to the fourth pick and place unit at position D. In the present example there are 96 pallets 114 on conveyor 110.

In the event only two ports or just one port is desired on the bags fabricated by the apparatus of this invention, one or two of the three feeder tracks 156 of the port feeding unit 150 are merely blocked off. The corresponding die punch 84 in the film pressing unit 50 are likewise removed.

After film sheet 18 has moved from film pressing unit 50 (with or without apertures punched at the fold line), it is positioned by conveyor 70 between port sealing unit 90 and that portion of conveyor 110 which holds ports 130 as shown in FIG. 6. Port sealing unit 90 includes a conventional press similar to that described above for the pressing unit 50 so that similar parts are designated as they appear in pressing unit 50. An I-beam 180 bearing an insulating block 182 and a sealing die 183 is secured to plate 52. Sealing die 183 has a top surface 184 whose width corresponds to the width of block 120 of the port retainers 118 on conveyor 110. Die 183 is connected to a source of radio frequency (not shown) of the order of about 27 megahertz ± 160 kilohertz and conveyor 110 is suitably grounded. When the film sheet 18 has moved the prescribed 24 inches and stops over die 183, bladder 53 is inflated causing plate 52 to move inwardly, surface 184 stopping against port flanges and film 18. Stop posts 58 are preset so as to give the proper thickness to the flange portion and film 18 after sealing. The top of film 18 makes contact with the bottom side of the flanges of ports 130. If there are spaced apertures in the film 18, the conduits of the ports are aligned directly over these apertures. A microswitch (not shown) located on block 120, and sensitive to the pressure between block 120 and die 183, actuates the RF power source to die 183 for about 1 second causing the flanges of ports 130 to be fused to film 18. After cessation of the RF power, die 183 remains in position for about a second before bladder 53 is exhausted and plate 52 returns to its original level. Conveyors 70 and 110 then move another 24 inches.

It will be noted the film sheet 18 is in a partial drape on each side as it passes through port sealing unit 90 (FIG. 7). As it leaves the end 188 of conveyor 70, the film sheet 18 is removed from pins 76 on conveyor 70 and is thus supported at its fold line by the attached ports 130 which in turn are still retained by conveyor 110. The film sheet 18 continues to drape further and by the time it reaches a bag sealing unit 190, both sides are substantially together to form two plies of film (see FIG. 14).

Bag sealing unit 190 comprises two presses, each similar to the press in pressing unit 50 but arranged on its side and each sharing the same posts 55 so that the plates 52 move in a horizontal direction. Roller bearing bushings 191 facilitate movement of plates 52 on posts 55. On one plate 52 is mounted a base 192 for back-up sealing plate 193. Plate 193 is provided with a suitable ground. The other plate 52 has a base 194 secured to it with an insulation plate 195 mounted on base 194. Plate 196 secured to plate 195 provides the mount for sealing die 197. Sealing die 197 is provided with a source of RF energy. In the present example, sealing die 197 (FIG. 15) is shaped to form four bags at a time and has flat raised portions 198 projecting from lower surfaces 199 (see FIGS. 15 and 16). Overriding the top of plate 196 and die 197 a hard plastic bar 200. A similar bar 201 is mounted at the bottom of plate 196. Bar 200 and the top portion of plate 193 have four cut-out sections (not shown but suggested by dotted lines) which allow four adjacent port retainers 118 on conveyor 110 to be nested therebetween when die 197 and plate 93 come together.

The two plies of film 18, after they have been positioned between die 197 and plate 193, must first be free of wrinkles before the two plies are sealed together to form bags otherwise creases and wrinkles will appear in the completed bag. Smoothing the two plies of film 18 is accomplished by film gripping device 205 located at the entrance to and near the bottom of bag sealing unit 190. As shown in FIGS. 17 and 18, film gripper 205 comprises a base 206 secured to a vertical mounting plate 207 which in turn is attached to support 204 of sealing unit 190. A conventional two-way air cylinder or actuator 208 with two air access ports 209, 209' is mounted below base 206 and includes a piston rod 210 extending from either end with piston 211 secured about midway on rod 210. The bottom end of rod 210 is threaded and has an adjustable stop 212. The upper end of rod 210 which fits loosely through base 206 terminates in and supports crossbar 213. Gripping arms 214 and 214' are pivotally attached at their lower ends to the extremities of crossbar 213 by means of pins 215. Gripping arms 214, 214' are generally hollow U-shaped members open at the backside. The top portion of each arm 214, 214' has an inwardly facing pad 216 made of any material which, when engaging plastic film 18, will not slip on or damage the plastic.

Somewhat below midway, the two arms 214, 214' are further connected by an air cylinder 217 whose piston 218 has a piston rod 219 pivotally connected at its outer end to the frame of arm 214' by a pin 220. The opposite end of air cylinder 217 has a pivotal connector 221 joining that end of the cylinder 217 to the frame of arm 214 by a pin 222. Air cylinder 217 is supplied with air access ports 223 and 223'. Four posts 224 connected to mounting plate 207 serve to help stabilize and limit the in and out movement of arms 214, 214'.

Following the positioning of the two plies of film 18 between die 197 and plate 193 of bag sealing unit 190, air cylinder 217 is actuated by air supplied to port 223' which causes the two arms 214, 214' to move inwardly whereupon pads 216 press the two plies of film together. Air is then supplied to port 209 of air cylinder 208 which causes arms 214, 214' to move downwardly a prescribed distance, thus straightening the two plies of film and removing any wrinkles. Plates 52 of bag sealing unit 190 are then actuated by bladders 53 to move inwardly a prescribed distance to bring the two plies in contact with each other. The pressure actuates a microswitch (not shown) which in turn actuates RF energy for about a second which fuses the two plies together to generate sealed sides and bottoms of a series of four connected bags separated by marginal zones. It should be noted the holes in the film formed when the film 18 was pressed over the pins 76 on conveyor 70 are now located within these marginal zones.

Following the sealing of the two plies, air is exhausted from bladders 53 of sealing unit 190 and plates 52 move outwardly. Film gripper 205 is actuated by allowing air to be exhausted from ports 209 and 223' and supplying air to ports 209' and 223. This causes arms 214, 214' to move out and up to be in position for the next operation of dewrinkling the film. Conveyor 110 then moves another 24 inches of two plies of film 18 into position within sealing unit 190.

Following the bag sealing operation, the series of attached bags suspended by their ports which are retained by conveyor 110 are transported to a bag severing unit 230. This unit 230 has two side by side presses similar to the two presses used in the bag sealing unit 190 except for insulation plate 195 and sealing die 197 (FIG. 19). In place of these two parts there is a base plate 231 to which is attached a cutting die 232 (FIG. 20) which has a pattern of outwardly extending blades 233 raised from the surface 234 of die 232. There may be additional blades 235 for producing a slit 236 in the bottom margin of a bag 237 for suspending the bag in an inverted position on a hook. Circular blades 238 may also be included on die 232 for making holes 239 in the top margins of a bag 237 to hang the bag in an upright position.

Following the movement of the series of joined sealed bags by conveyor 110 from sealing unit 190, a group of four joined bags come to rest momentarily between back-up plate 193 and cutting die 232. Actuation of the two presses in bag severing unit 230 causes plate 193 and cutting die 232 to come together and then move apart. This action severs the joined bags into separate bags 237 by cuts outboard of the sealed margins 240 of the bag 237 allowing the marginal zones 241 to peel from the bags (FIG. 21).

When the separate bags 237 reach the end 242 of conveyor 110, they may be removed by pulling on the bags with enough force to overcome the engagement of the tubular portion of the ports 130 between the paired pegs 126 of the port retainer 118. This can be accomplished manually or by mechanical means, such as bag remover 290. In the present example, bag remover 290 comprises four pairs of bag grippers 292, each pair spaced so as to be in alignment with the middle of a bag 237, with one gripper 292 on each side of the bag. Each pair is located a short distance below conveyor 110 (see FIG. 22). Each gripper 292 consists of a circular base 294 having a gripping pad 296 mounted on base 294. Pad 296 has a flat, curved outer surface consisting of a resilient material. Each base 294 has a pulley 298 mounted on it and each pulley 298 is driven by a belt 302 common to each which in turn is driven by pulley 300 connected by belt 306 to a pulley 304 on main drive shaft 270 (see FIG. 23). The net results is that each base 294 of each pair of grippers 292 rotate constantly in opposite directions to each other and inwardly toward a bag 237. The two pads 296 are so positioned on their bases that during the time conveyor 110 is moving, the pads are moving approximately between points F and G. When conveyor 110 halts momentarily, pads 296 are approximately at positions indicated by dotted lines and continue to move inwardly toward bag 237, making pressure contact with the bag. As they roll past, the pads effect a downward tug on the bag of a force sufficient to overcome the force holding the port in port retainer 118 and remove the suspended bag from conveyor 110. As pads 296 move to position F, the bag is released and drops into a collection bin.

Figure 1:
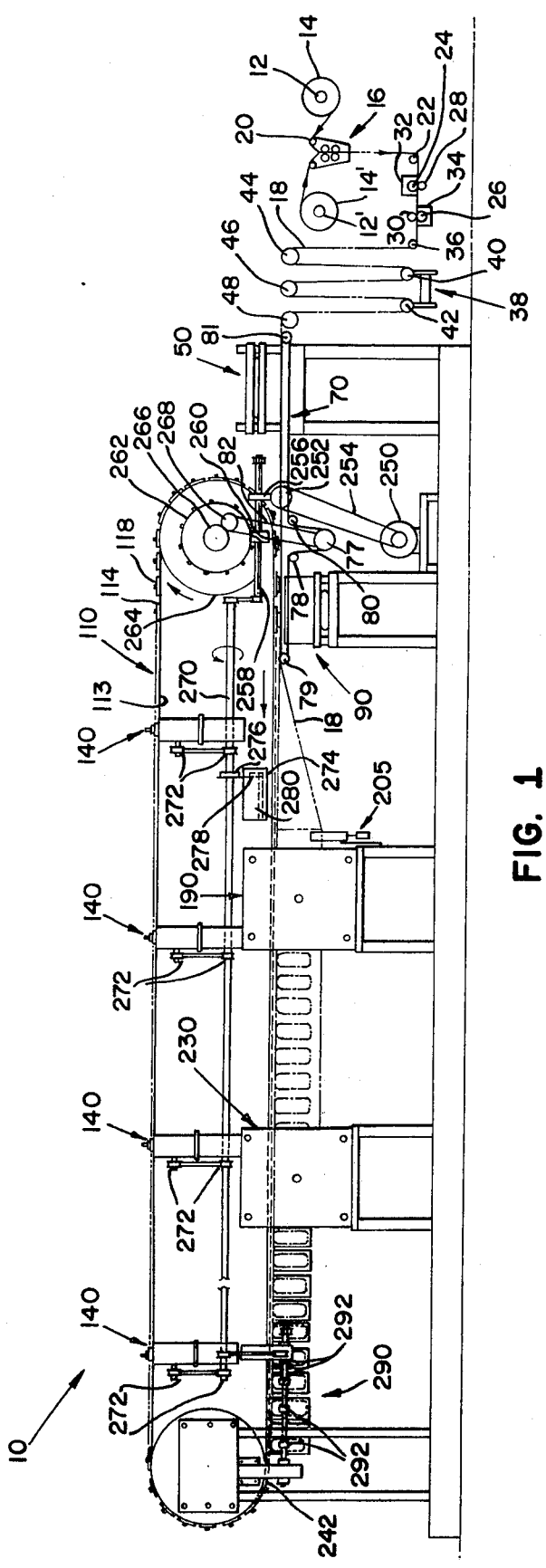
FIG. 1 is a side view in schematic of a bag making apparatus incorporating features of the present invention.

It becomes evident that a great number of individual maneuvers by the various units and conveyors of this apparatus must be synchronized while the film moves with uniform interrupted motion through the apparatus to be converted into ported bags. Reference is made to FIGS. 1 and 2 to illustrate how this is accomplished.

The power source for all manevers originates either directly or indirectly with variable speed motor 250 which turns worm 252 by belt 254. Worm gear 256 meshing with worm 252 turns shaft 258. Worm gear 260 on shaft 258 is constructed so as to turn roller gear 262 a prescribed distance, then to cause gear 262 to stop or dwell a prescribed interval of time before turning the next prescribed distance. Gear 262 being attached to sprocket wheel 264 causes the latter to move, as in the present example, a distance on its circumference of 24 inches which causes conveyor 110 likewise to move 24 inches, dwell a prescribed time interval, and move another 24 inches.

Film conveyor 70 is also driven by the movement of sprocket wheel 264. Gear 266 associated with wheel 264 intermittently moves gear 268. This intermittent movement is transmitted from gear 268 to belt 82 which powers drive wheel 77 and causes conveyor 70 to move 24 inches, dwell a prescribed time period and move the next 24 inches, etc.

Main drive shaft 270 is connected by pulleys and a belt to shaft 258. Drive shaft 270 extends substantially the full length of conveyor 110 and provides the power for operating the four pick and place units 140 via pairs of pulleys 272. Drive shaft 270 also powers a series of cammed switches located in switch box 274 by way of pulleys 276 and 278 driving shaft 280. Each switch is actuated by adjustable cams located on shaft 280 so that each switch turns its particular function or air valve on or off for prescribed time periods. Thus each air valve associated with each air bladder in units 50, 90, 190 and 230, as well as each air valve associated with each air cylinder 162 operating the four port loading platforms 160, and air cylinders 208 and 217 operating the film gripping unit 205 may be programmed independently of each other so as to synchronize the movements of all the parts.

Whereas the preceding description shows an apparatus which makes groups of four bags every few seconds, the apparatus of this invention may be designed so as to produce a fewer or greater number of bags per group. This is accomplished merely by decreasing or increasing the dimensions of the various pressing units and conveyors, subtracting or adding to the number of port feeders, pick and place units, bag removers, etc., and varying the length which the conveyors travel between stops.

From the foregoing disclosure, it is believed the invention may be readily understood by those skilled in the art without further description and that various modifications may be made in the details disclosed without departing from the spirit of the invention as set forth in the following claims.

What is claimed is:

1. An apparatus for manufacturing plastic bags from a continuous film sheet and having at least one tubular port on each bag, said apparatus comprising
   a. a first conveyor having means for retaining the film sheet to prevent changes in lateral movement while progressing the sheet in a longitudinal direction, said first conveyor being actuatable to move a constant length with fixed pauses between each movement.
   b. a first press means adjacent the first conveyor for engaging the film sheet with the sheet retaining means during the fixed pauses,
   c. a second conveyor having means for retaining a multiplicity of ports, each port having a tubular portion and a flange portion, the port retaining means adapted to engage the tubular portions of the ports, said second conveyor being actuatable to synchronize with and have the same movement and fixed pauses as that of said first conveyor,
   d. a second press means associated with said first and second conveyors when the sheet becomes positioned between them, the second press means being actuatable during said fixed pauses to bring portions of the surface at a fold line of the sheet into contact with the flanges of the ports, the second press means further having means for sealing said portions of the sheet to the flanges during the fixed pauses,
   e. a third press means, downstream from the second press means and below said second conveyor, having means for removing wrinkles from two plies of draped film sheet during the fixed pauses of said second conveyor, said two plies being formed by the removal of the sheet from the sheet retaining means of said first conveyor so that the sheet is supported by the ports which are held by the port retaining means of said second conveyor, and
   f. a fourth press means, downstream of the third press means and below said second conveyor, and actuatable during the fixed pauses of said second conveyor to bring portions of the two plies of the sheet into contact with each other, said fourth press means further having means for sealing said portions of the two plies together during the fixed pauses of said second conveyor to form closed connected bags.

2. The apparatus of claim 1 further including film sheet cleansing means positioned prior to said first press means.

3. The apparatus of claim 2 wherein said sheet cleansing means includes at least one rotary brush vacuum roller.

4. The apparatus of claim 3 further including at least one air roll positioned between said rotary brush vacuum roller and said first press means over which the sheet is floatingly supported by a flow of air.

5. The apparatus of claim 4 further including film sheet tensioning means associated with said air roll for maintaining uniform tension on the film sheet.

6. The apparatus of claim 5 wherin said film sheet tensioning means includes at least one rotatable roller on which the sheet rides, the roller further being adapted to move inwardly and outwardly in response to changes in tension on the sheet.

7. The apparatus of claim 2 further including aperture punching means incorporated with said first press means for forming spaced apertures longitudinally in the fold line of the sheet at the same time the first press means engages the sheet with the sheet retaining means, said apertures being positioned to coincide with passages in the ports when the ports are sealed to the fold line of the sheet.

8. The apparatus of claim 1 further including a fifth press means downstream of the fourth press means and below said second conveyor, said fifth press means having sheet cutting means and being actuatable during the fixed pauses of said second conveyor whereby at least portions of the film sheet are severed outboard of the sealed sides and within marginal zones between the connected bags.

9. The apparatus of claim 8 further including bag removing means located downstream from the fifth press means, said bag removing means being actuatable during the fixed pauses of said second conveyor so as to overcome the force of the port retaining means and remove the bags from said second conveyor.

10. The apparatus of claim 1 wherein said first conveyor comprises two parallel continuous belts and the sheet retaining means comprises uniformly spaced pins on each belt, the spacing between the pins on each belt being such that the sheet is engaged transversely by the pins.

11. The apparatus of claim 7 wherein said first conveyor comprises two parallel continuous belts and the sheet retaining means comprises uniformly spaced pins on each belt, the spacing between the pins on each belt being such that the sheet is engaged transversely by the pins and symmetrically between the longitudinally spaced apertures.

12. The apparatus of claim 1 wherein said second conveyor comprises a series of continuously linked pallets and said port retaining means comprises a series of uniformly spaced blocks on said pallets, each of said blocks having at least one recess and having two parallel pegs extending through said block so that at least a portion of each peg projects laterally from the walls of the recess at a point below the opening to the recess, whereby the tubular portion of a port is retained by compression between said portions of the two pegs.

13. In a process for fabricating flexible plastic bags from a continuous sheet of film, each bag having at least one port sealed thereto, the improvement comprising sequentially 1. pressing the film onto a film retaining conveyor,
2. actuating the conveyor to cause the film to progress to a port sealing unit,
3. aligning a series of flanged tubular ports above a fold line of the film at the port sealing unit, said ports being retained by port retaining means whereby the flanges of the ports are in close proximity to the film,
4. actuating the port sealing unit to cause the film to contact and seal to the flanges of the ports,
5. removing the film from the film retaining conveyor and allowing the film to drape vertically into two plies and be suspended by the sealed ports which are retained by the port retaining means,
6. actuating the port retaining means to positon the draped film between film smoothing means and two bag sealing plates,
7. actuating the film smoothing means and subsequently actuating the bag sealing plates to smooth the two plies and seal portions of the two plies together to form connected bags,
8. actuating the port retainer means to move the connected bags and position them between cutting plates, and
9. actuating the cutting plates to cause at least a portion of the film between the connected bags to be severed.

* * * * *